United States Patent Office
2,913,783
Patented Nov. 24, 1959

2,913,783

WINDOW SEALS

Thomas John Robert Bright, Warwick, England

Application October 1, 1956, Serial No. 613,282

1 Claim. (Cl. 20—69)

This invention relates to window seals for excluding moisture or draughts, the present invention being virtually an improvement in or modification of the draught excluding strip, beading or moulding forming the subject of my prior Patent No. 2,554,452 issued May 22, 1951. The present invention, although applicable to windows generally which include a sliding glass pane is particularly concerned with the sealing of vehicle windows which are slidable into and out of the doors or body of the vehicle, the invention being concerned with providing a good seal where the window enters the opening provided in the door or body side for its reception. Such seals may be mounted exteriorly of the window where they serve to prevent water running down the window, finding its way into the opening in the door or body side, or to seals which are arranged internally of the window and which are intended primarily to exclude draughts from the vehicle. It will be appreciated that the exterior seals really perform the dual purpose of excluding water and draught, whilst inner and outer seals assist in preventing vibration of the window, particularly when the latter is in its partially open or fully open position.

Such seals as at present constructed make rubbing contact with the window and in the case of an interior seal usually take the form of a rubber strip which is adhesively or otherwise secured to the inner face of a downwardly depending flange forming a part of the window sill or equivalently shaped part of the body side. It is very difficult to replace this type of seal without removal of the door or body trim and the window and its associated mechanism and consequently it is rare that such seals are replaced during the life of the vehicle, even though they may become so worn or otherwise damaged as to allow water to pass freely down the outside of the window past the seal and into the interior of the door or body side where it is liable to cause excessive rusting of the metal parts of the door and body.

In the case of an interiorly mounted strip, replacement is not quite so difficult, but naturally, as this strip is protected from the elements its replacement is not quite so important.

The chief object of the invention is to evolve a window seal intended particularly for use on vehicles, for example motor cars, and of a generally improved construction which will not only be efficient in use, but which can be easily and quickly applied and replaced when necessary.

A window seal in accordance with the present invention includes an effective portion for making rubbing contact with the window and an attachment portion in the form of a clip which is capable of universal bending movement, the clip being adapted to make direct or indirect frictional or interlocking engagement with a flange or other fixed part adjacent the window. The effective portion will take either the form of a rubber or other soft strip or portion and in the case of a seal which is intended to be mounted interiorly of the window, the effective portion may comprise or include a pile fabric.

Referring to the drawings:

Figures 1a, 1b and 1c illustrate three alternative forms of seals.

Figures 2, 2a, 2b, 2c and 2d illustrate five alternative forms of seals.

Figures 3, 3a, 3b, and 3c illustrate four further alternative forms of window seals.

Figure 1:
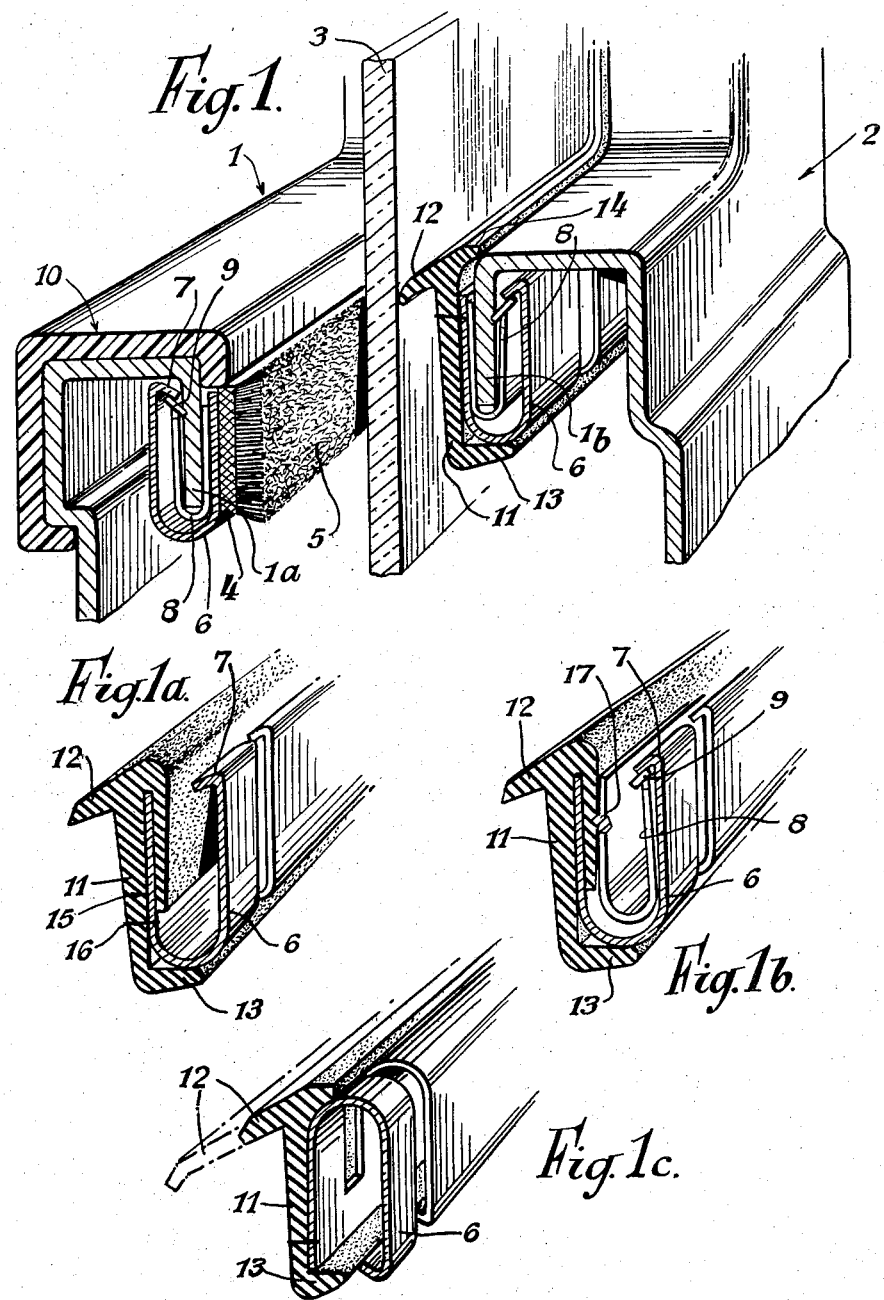
Figure 1 is a sectional perspective view of inner and outer window seals according to one form of the invention.

Referring in the first case to Figure 1 of the accompanying drawings the section is taken through the inner and outer flanges of the car body forming the inner and outer window sill. The inner sill member is indicated generally by reference numeral 1 and the outer sill member by reference numeral 2. The window glass 3 is slidably mounted between these components, and it is necessary to provide an effective seal on both sides of the window glass and particularly on the outside thereof to prevent rain and moisture generally finding its way downwardly over the surface of the glass and into the interior of the vehicle door, or other part of the body.

The sill portions 1 and 2 include depending flange portions 1a and 1b respectively and advantage is taken of these two flange portions to support the inner and outer seals thereon.

The inner seal includes a fabric or other backing 4 carrying a pile or like surface 5 which makes rubbing contact with the inner surface of the window glass. The backing 4 is stitched, adhesively secured or otherwise connected to a continuous substantially inverted U shaped clip 6, the clip being formed along one edge with an inwardly directed lip 7 which is adapted to override and make positive interlocking engagement with a series of substantially inverted U shaped tags 8 formed with inwardly and downwardly inclined pressed out tangs 9 which frictionally engage the adjacent surface of the flange 1a. The clip is preferably of the kind disclosed by the specification and drawings of my prior Patent No. 2,554,452 issued May 22, 1951, the clip being formed with inwardly directed slots having a depth substantially greater than half the width of the strip from which the clip is produced, the slots being staggered relative to one another, the arrangement being such that the clip is capable of universal bending movement.

The window moulding which encloses the sill 1 on the inside of the window is indicated generally by reference numeral 10.

The seal for engaging the outer face of the window glass 3 takes the form of a rubber or plastic moulding 11, carrying an inwardly directed flange 12 which makes substantially linear engagement with the window glass, the moulding or sealing strip 11 being carried by a clip 6 similar to that used on the inside of the window, the clip making positive interlocking engagement with a series of tags 8 frictionally engaging the flange 1b. The sealing strip 11 is stitched, tanged or otherwise attached to the clip 6, the strip having at its lower end an outwardly directed flange 13 which lies beneath the clip 6, the strip also being formed at its upper end with an outwardly directed flange 14 which prevents moisture passing between the sill 2 and the sealing strip, and finding its way into the interior of the clip 6.

Figures 1a, 1b and 1c illustrate three alternative forms of sealing strip 11 which may be used on either side of the window. In Figure 1a the strip is deeply recessed as at 15 for the entry of one of the limbs of the clip 6, the strip 11 being stitched as at 16, tanged or otherwise secured in position upon the clip.

In Figure 1b the strip 11 is again recessed to receive one limb of the clip, but instead of securing the strip by means of sewing, the tags 8 which are intended to frictionally engage the flange 1b are formed with outwardly directed tangs 17 which are intended to bite into the rubber strip 11, so as to secure the latter in position, the clip by virtue of the fact that it is provided with an inwardly directed lip 7 which overrides one of the edges of each tag 8, holding the tags and clip together, so that the assembly will be secured firmly in position on the flange 1b, each tag having one or more inclined tangs 9 as in Figure 1.

In the case of Figure 1c this construction is designed for use with an upwardly directed flange as distinct from the downwardly directed flange 1b shown in Figure 1. The construction again includes a universally bendable continuous clip to which the rubber or plastic section is stitched, tanged or otherwise secured, the section including a flange 12 which may be extended if necessary so that it occupies the dotted line position.

Figure 2:
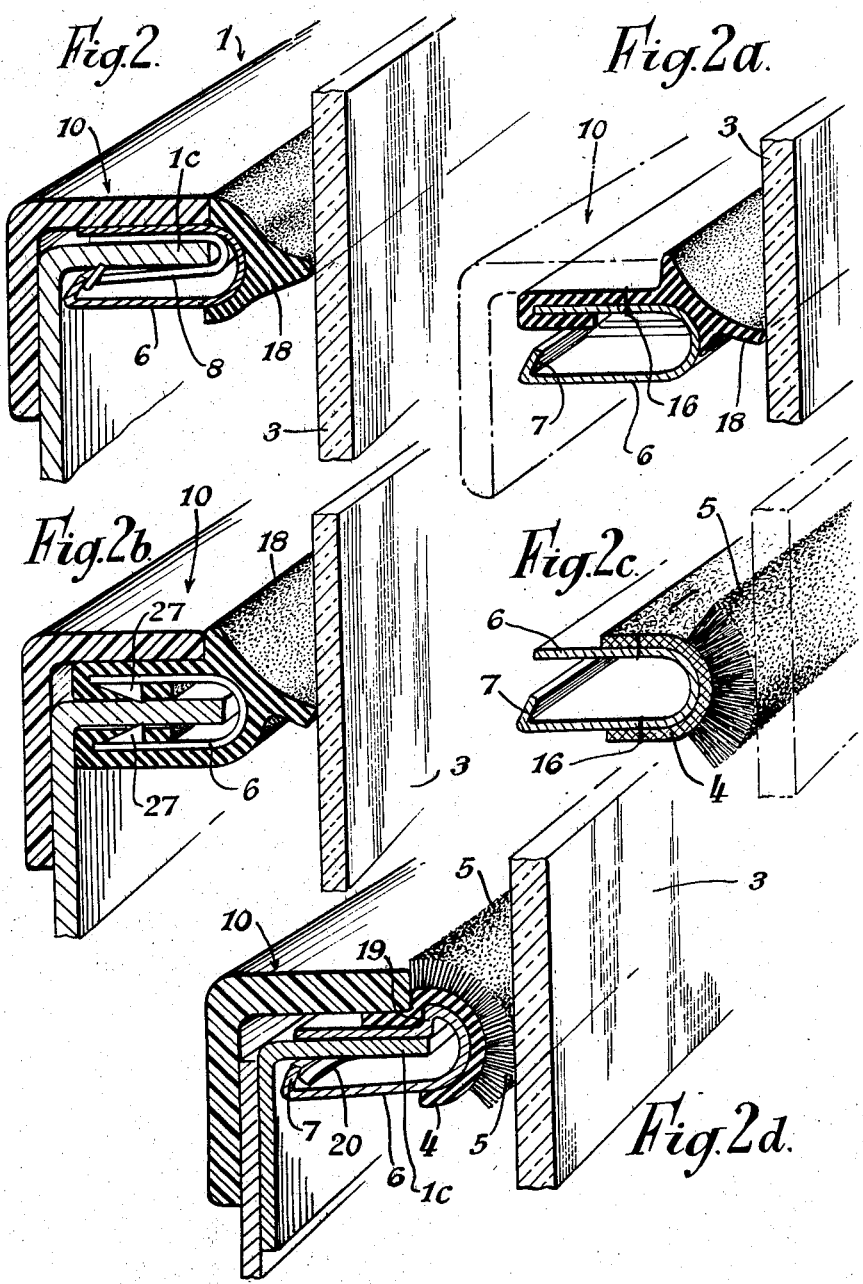

Figures 2, 2a, 2b, 2c and 2d illustrate five alternative forms of window seals. In Figures 2 and 2a the sealing strip 18 takes the form of a rubber or plastic moulding which is secured in position upon a universally bendable continuous clip 6 which makes positive interlocking engagement with a series of spaced spring tags 8 frictionally engaging the outwardly directed flange 1c. In the case of Figure 2a the section 18 is recessed to receive one limb of the clip, the strip being sewn to the clip as at 16.

Figure 2b is a modification of Figure 2a and in this case both edges of the sealing strip are turned over the longitudinal edges of the continuous clip, the latter being formed with pressed out tangs 27 which perforate the inwardly turned edges of the strip and frictionally engage the supporting flange.

In the case of Figure 2c and 2d the sealing strip is somewhat similar in construction to that shown in Figure 1, and includes a fabric or other backing 4 carrying a pile surface 5, the backing being stitched as at 16 to the continuous universally bendable clip 6, the sealing member in this case being of curved cross-sectional shape as is clearly shown in the figure.

In the case of Figure 2d the continuous clip 6 is kinked as at 19, the fabric or other backing 4 being sandwiched between the part 19 and the moulded angle shaped window moulding 10. The backing may be sewn or otherwise secured in position upon the clip 6, the latter being provided with an inwardly directed lip 7 which overrides a series of projections 20 which are pressed out of the flange 1c, the clip, therefore, making positive interlocking engagements with the flange.

In Figures 3, 3a, 3b and 3c four alternative forms of window sealing strips are shown which are preferably used inside the window but may be used exteriorly, each of which includes a fabric or other backing part 4 carrying a pile surface 5, but in this case a sponge rubber or other comparatively soft insert 26 is interposed between the supporting clip 6 and the fabric or other backing 4 which gives the sealing strip an increased degree of resiliency, and tolerance.

Figure 3:
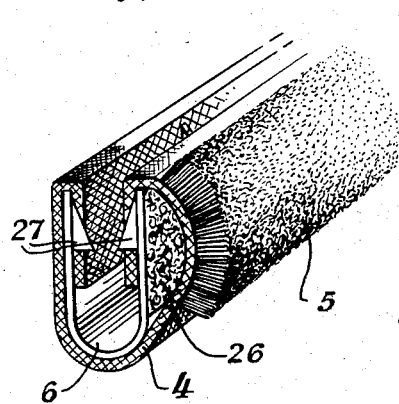

In Figure 3 the clip is formed with inwardly directed tangs 27 which frictionally engage the flange 1a and which also perforate the fabric or other backing 4, which is turned over the longitudinal edges of the clip and into the interior thereof, thereby securing the backing together with the pile surface 5, and also the sponge rubber insert 26 in position upon their associated clip.

Figure 3A:
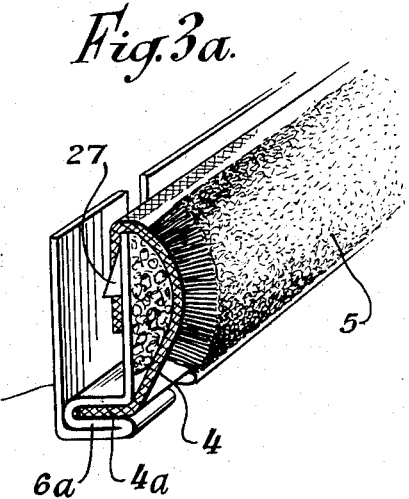

In the case of Figure 3a one edge 4a of the fabric or other backing is gripped in position by bending over the part 6a of the clip whilst the opposite edge is held in position by means of inwardly directed tangs 27. Tangs 27 are similar to those shown in Figure 4, but in this case are arranged on one side only of the clip.

Figure 3B:
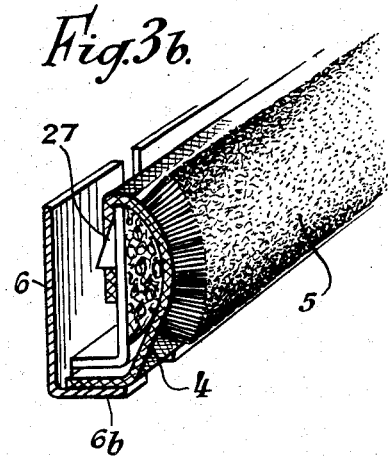

In Figure 3b the base of the clip instead of being bent over as at 6a in Figure 3a is formed with pressed out projections 6b which grip one edge of the fabric or other backing, the opposite edge being secured by inwardly directed tangs 27.

Figure 3C:
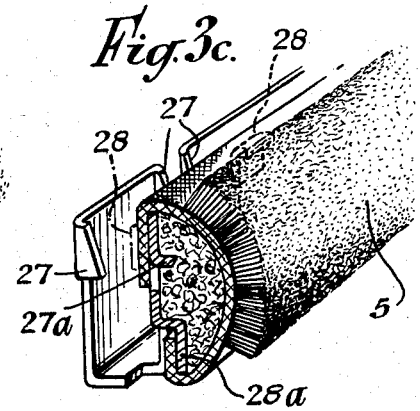

In Figure 3c the clip is formed with a series of tangs 27 which frictionally engage the flange 1a and thereby secure the clip in position thereon, the clip being formed with additional pressed out parts 28, which after perforating the fabric or other backing are turned over to secure it in position and with additional pressed out parts 28a which hold the opposite edge of the fabric or other backing. The clip furthermore, is provided with outwardly directed tangs 27a which perforate the sponge rubber or other insert and assist in locating the latter in position adjacent one limb of the clip. In the construction shown in Figures 3, 3a, 3b and 3c, the pile covering is curved in cross section and engages the face of the window glass.

I claim:

A window seal for an automobile window including a movable transparent plate, a window sill, and a mounting flange depending from said sill in a plane generally parallel to said plate, said seal comprising a series of U-shaped spring tags straddling said flange and each having a tang mounted on the end of one of its limbs, a continuous U-shaped clip straddling said tags and formed with spaced slots therein so as to be capable of universal bending movement, an effective portion of resilient material mounted on one leg of said U-shaped clip, a lip on said effective portion extending substantially normal thereto and lying in moisture-protective relation over the bight of said clip, a first flange of resilient material integral with said effective portion and extending into sealing contact with said transparent plate, a second flange of resilient material integral and substantially co-planar with said first flange and extending from said effective portion into contact and sealing relation with said sill and defining with said mounting flange and said U-shaped clip a space to accommodate the displacement of said effective portion caused by actuation of said transparent plate, said first flange forming an angle with said plate such that upon raising said transparent plate there is a tendency to cam said first flange to a tighter seal contact with said plate.

References Cited in the file of this patent

UNITED STATES PATENTS

| | | |
|---|---|---|
| 2,192,651 | Rydquist | Mar. 5, 1940 |
| 2,457,312 | Kramer | Dec. 28, 1948 |
| 2,464,406 | Kramer | Mar. 15, 1949 |
| 2,554,452 | Bright | May 22, 1951 |
| 2,724,877 | Ramsay | Nov. 29, 1955 |

FOREIGN PATENTS

| | | |
|---|---|---|
| 645,558 | Great Britain | Nov. 1, 1950 |
| 707,757 | Great Britain | Apr. 21, 1954 |